July 24, 1951

R. W. HART 2,561,366

SIGNAL DETECTOR

Filed Dec. 1, 1947

INVENTOR
ROBERT W. HART

BY

ATTORNEY

INVENTOR
ROBERT W. HART

BY *M. C. Hayes*

ATTORNEY

Patented July 24, 1951

2,561,366

UNITED STATES PATENT OFFICE 2,561,366

SIGNAL DETECTOR

Robert W. Hart, Lynn, Mass.

Application December 1, 1947, Serial No. 789,010

20 Claims. (Cl. 177—386)

(Granted under the act of March 3, 1883, as amended April 30, 1928; 370 O. G. 757)

This invention relates to detector means and, more particularly, to detector means employing a resonant system as an energy storage and accumulating means.

In its broadest scope, the present invention involves employing, as an energy storage or accumulating means, a tuned resonant system. Generally, energy added to such a system in a random manner will not increase the amplitude of the oscillation of said system, while energy added in synchronism with the oscillations of the resonant system will result in an increase in the oscillation of said system. The present invention, therefore, contemplates causing signals to be detected to add energy to said system in synchronism with the oscillations thereof while extraneous signals are applied to said system in a random manner. The amplitude of oscillation of the resonant system is indicative of the energy added to the system, and this amplitude may be, and in this invention is, employed to indicate when a predetermined amount of energy has been added to the system.

In general, the resonant system may be considered as an integrating system whereby energy, applied synchronously with the oscillations of said system, results in an integral of finite value, while random signals result in an integral having a value of substantially zero for any time interval comparable to, or longer than, the time required to add the above-mentioned predetermined amount of energy to the system. It will also appear, as the description of the invention proceeds, that such a system includes certain features that may limit the amount of energy added to the system for each oscillation thereof. These last-mentioned features provide discrimination against large amplitude signals of short duration, while the features previously mentioned provide means whereby signals of very small amplitudes, which persist for a prolonged period of time, may be detected.

It should be obvious from the foregoing description of the invention that, in its broadest scope, the present invention is not limited to any particular type or class of resonant system. That is, the system may be electrical or mechanical in nature and may operate at a resonant frequency that is high or low. Further, it should be obvious that the means for applying the signals to the resonant system may be embodied in many forms. For example, the means for adding the energy may be either electrical or mechanical in nature, depending somewhat on the type of resonant system employed and, if electrical in nature, it may be either electrostatic or electromagnetic.

However, recognizing the broad scope of the present invention and without any intention of limiting the invention, for illustrative purposes, there are hereinafter described certain embodiments of the invention employing a vibrating reed as the resonant system. The means for adding energy to the system are primarily electromagnetic in nature.

The persent invention is concerned with two closely related problems often encountered in the fields of engineering, industry and science. The first problem is to provide a system that will respond to a sustained signal of small amplitude but which will not respond to noise signals or other short duration, high amplitude signals. The second and closely related problem is to provide a system that will respond to a small difference between two signals if continued over an extended period of time, but which will not respond to large instantaneous differences between the two signals.

The several embodiments of the present invention hereinafter to be described provide circuits that meet the requirements of both the above-mentioned problems. For facilitating description of the invention, the term "actuating signal" will be used to denote either a single input signal or the difference between two input signals if the invention is employed to respond to such a difference.

In certain applications it is desirable to provide the indication or initiate the operation of an electrical circuit or some mechanical device when the actuating signal has persisted for a predetermined time, regardless of the amplitude of this actuating signal. In other applications, it is desirable that the indication be provided if the actuating signal has persisted for a predetermined time, this time being some function of the amplitude of the actuating signal. In these last-mentioned applications, it is usually desirable that the actuating signal persist for a certain minimum time duration, even for very large signals, before the circuit responds. That is, a very high amplitude signal of short duration should not actuate the circuit while the same signal or a lower amplitude signal persisting for a longer time should actuate the circuit. In still other applications, it is desirable to provide the indication only when the actuating signal reaches a certain predetermined value. The present invention is concerned only with the first two applications mentioned above and, more particularly, with the second application.

Therefore, it is an object of the present invention to provide means for indicating that a certain difference in signals from two different signal sources has persisted for a predetermined length of time.

A further object is to provide means for detecting a minute but persisting signal from a single source.

Another object of the present invention is to provide means of detecting minute but persisting differences between two applied signals.

A further object of this invention is to provide means capable of detecting minute persisting differences between two applied signals but which will not respond to large differences of relatively short duration.

An additional object of the present invention is to provide a circuit that will respond to a continuing signal but which will not respond to a signal of short duration.

It is a further object of the invention to provide a circuit that will provide an indication whenever a minute difference between two applied signals persists for a relatively long time or when a larger difference between the two applied signals persists for a shorter time but which will not provide an indication when a difference of any magnitude persists for only a short time.

It is a further object of the present invention to provide novel means for providing a signal whenever a difference in the intensity of sounds from two directions persists for a predetermined length of time.

Other objects, features and advantages of this invention will become apparent from the following description of the invention which is to be read in conjunction with the accompanying drawings in which.

Figure 1:
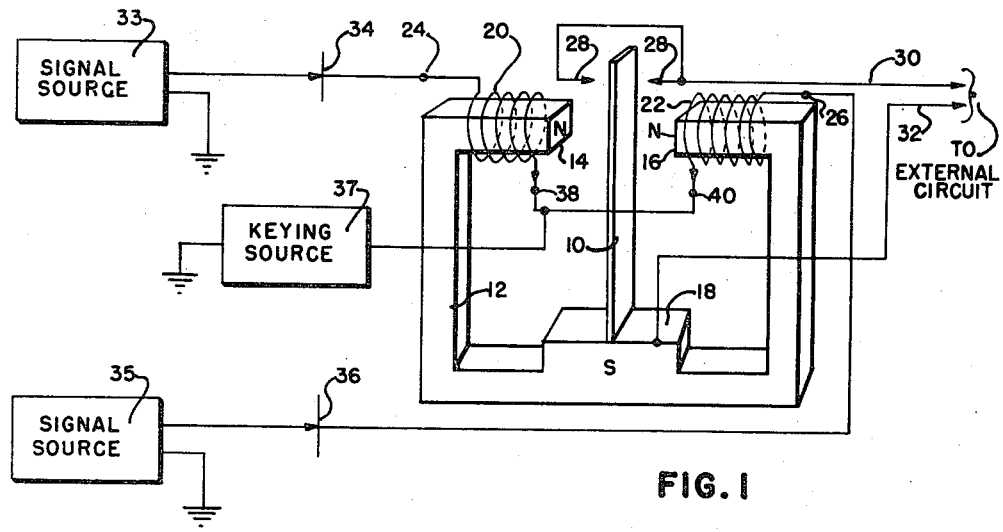
Fig. 1 is a schematic drawing of an embodiment of the present invention adapted to respond to the difference between two received signals.

As the description of the invention proceeds, it will become apparent that each embodiment of the invention operates by comparing the amplitude of two signals. If the invention is employed to respond to a single signal, this signal is so received that it is applied to the comparator circuit, which forms a portion of the present invention, as two signals of unequal amplitude. Therefore, it is believed that the invention will be best understood by making reference first to Fig. 1, wherein there is shown an embodiment of the invention adapted to respond to the difference between two applied signals. In Fig. 1 there is shown a reed 10 supported at one end thereof on a metallic yoke 12. Yoke 12 is preferably of magnetic material and may or may not be magnetized. If magnetized, pole faces 14 and 16 are preferably magnetized alike. That is, pole faces 14 and 16 should be either both north poles, as represented by the letters N in Fig. 1, or should be both south poles. If faces 14 and 16 are north poles as shown, the south pole of the yoke will be at the projection 18 on which is mounted reed 10. The lower end of reed 10 may be secured to projection 18 by any convenient means, subject only to the requirement hereinafter set forth regarding the minimizing frictional losses in the reed.

Reed 10 is formed from a magnetic material but is not permanently magnetized. Optimum operation of the comparator system will be obtained when the damping of reed 10 is reduced to a minimum. Air damping may be minimized by providing an air tight evacuated inclosure (not shown) for reed 10 and yoke 12. Molecular damping, due to bending of the reed during vibration, may be reduced by so proportioning the reed that it bends uniformly throughout its length. Magnetic damping and damping due to counterelectromotive force, resulting from changes in the magnetic field as the reed vibrates, can be reduced to a minimum by application of a number of known experimental and theoretical techniques. Reed 10 preferably has a natural frequency in the low audio range; a frequency of 25 cycles having been found satisfactory for certain applications.

A pair of deflection coils 20 and 22 are wound on pole pieces 14 and 16, respectively. Coils 20 and 22 are wound in such a manner that current flowing into coil 20 from terminal 24 produces a change in the magnesium of pole piece 14 that is in the same direction as the change produced in pole piece 16 by current flowing into coil 22 from terminal 26. Ideally, equal currents flowing into coils 20 and 22, respectively, from terimnals 24 and 26, respectively, will produce equal and like effects in the magnetism of pole pieces 14 and 16, respectively. As will be shown in connection with Fig. 3, slight variations from this ideal condition may be compensated for in associated circuit elements.

A pair of contact points 28 are disposed on opposite sides of reed 10. The spacing between the reed 10 and points 28 is such that a certain amplitude of vibration must be achieved before reed 10 contacts points 28. An electrical conductor 30 is connected to points 28 and a conductor 32 is connected to reed 10. Conductors 30 and 32 extend to an external circuit (not shown in Fig. 1) that may be activated by the completion of an electrical circuit.

A source of electrical signals, shown in Fig. 1 as source 33, is connected between ground and terminal 24 through a rectifier 34. Rectifier 34 may be a crystal, oxide, vacuum tube, or any other type of rectifier that offers a comparatively low resistance to current flowing from source 33 to terminal 34 but which offers a comparatively high resistance to current flow in the reverse direction.

A second source of electrical signals, shown in Fig. 1 as source 35, is connected between ground and terminal 26 through a recifier 36. Rectifier 36 preferably has characteristics similar to those of rectifier 34. If desired, the polarity of both rectifiers may be reversed without altering the operation of the circuit.

A third source of signals, designated keying source 37 in Fig. 1, is connected between ground and terminals 38 and 40 on coils 20 and 22, respectively. For efficient operation of the comparator circuit, the keying source 37 should provide an alternating voltage output having a stable frequency exactly equal to the natural frequency of reed 10. It is recognized that, in practice, it is extremely difficult to obtain exact equality between the frequency of reed 10 and the frequency of the signal from the source 37. However, optimum operation is obtained when such deviations are at a minimum.

The amplitude of the signal from the source 37 is preferably larger than the maximum amplitude of the signal from either source 33 or source 35. In order to prevent reed 10 from responding to high amplitude signals of short duration, it is desirable to provide conventional means for limiting the maximum amplitude of the signal from sources 33 and 35.

If the frequency of the signals from sources 33 and 35 is high compared to the frequency of the signal from keying source 37, the circuit shown in Fig. 1 will respond primarily to the difference in amplitude between signals from source 33 and signals from source 35. However, if the frequency of the signals from sources 33 and 35 are comparable to the frequency of the signals from keying source 37 or if any modulation frequency present in the signals from sources 33 and 35 is comparable to the frequency of the signal from source 37, the circuit shown in Fig. 1 will respond to differences in the phase of signals from sources 33 and 35 as well as differences in amplitude.

The circuit of Fig. 1 operates as follows: On one half cycle of the signal from the keying source 37, rectifiers 34 and 36 are so biased that they are completely non-conducting, even though a signal is being supplied by either or both of sources 33 or 35. If necessary, the keying source 37 may include a source of direct bias potential to insure that the rectifiers 34 and 36 do not conduct on this half cycle. On alternate half cycles, rectifiers 34 and 36 are rendered conductive by the signal from the keying source 37. If there is no signal being supplied by either source 33 or source 35, or if the signals being supplied are identical, each component of current flowing through coil 20 will be matched by a similar component in coil 22. Under these conditions, reed 10 will be acted upon by magnetic forces equal in magnitude but opposite in direction. Under the influence of such equal and opposite forces, reed 10 will remain stationary.

Now assume, for purpose of illustration, that the signal from source 33 differs in amplitude from that from source 35 by a minute amount. When rectifiers 34 and 36 are rendered conductive by the signal from the keying source 37, the currents through coils 20 and 22 will be slightly different in amplitude. This results in the forces exerted on reed 10 being slightly different in magnitude. Assume that this unbalance in forces tends to force the free end of reed 10 toward pole face 14. The displacement of reed 10 during the first half cycle of signal from the keying source 37 resulting from this difference will be far less than that required to cause reed 10 to make contact with points 28. If this difference does not persist until the next time that rectifiers 34 and 36 are conductive, the net result will be a very small oscillation that will in time be damped due to frictional forces acting on the reed 10.

However, assume for purposes of illustration that the difference continues for many, for example several hundred, cycles of the signal from the keying source. During each half cycle that rectifiers 34 and 36 are conductive, a force acts on reed 10 tending to attract reed 10 to pole face 14. Since the frequency of the keying source is equal to the natural frequency of vibration of reed 10, the reed is driven at resonance. As long as the difference in the signals from sources 33 and 35 remains in the same direction, the net magnetic force exerted on reed 10 resulting from the difference in amplitude of the two signals will cause the amplitude of vibration of reed 10 to increase. After many cycles of the signal from keying source 37, reed 10 will contact points 28, thus completing the electrical circuit.

A change in the magnitude of the difference between the forces exerted by the coils 20 and 22 will change the rate at which the vibration of reed 10 builds up, but it will not otherwise affect the operation of the system, provided the direction of the difference does not change. If, however, before reed 10 makes electrical contact with points 28 the direction of the resultant of the forces exerted by coils 20 and 22 reverses, the result will be to reduce the amplitude of oscillation of reed 10. If this new difference is continued long enough, reed 10 will eventually stop vibrating entirely and then start vibrating again one-half cycle out of phase with the previous vibration.

Now, if the amplitude of the signals from sources 33 and 35 is restricted to certain limits, say between zero and some maximum value, the difference in the forces exerted by coils 20 and 22 can never exceed a certain maximum value. The constants of the circuit can be selected so that this difference must continue for a predetermined number of cycles of the signal from keying source 37 before contact is made between reed 10 and points 28. If the difference existing between signals from sources 33 and 35 is less than the maximum possible difference, the difference between the forces exerted by coils 20 and 22 will be less than the above-mentioned maximum value, hence the time required for reed 10 to contact points 28 will be somewhat longer than it is with maximum force applied to the reed.

It should be noted that if the resultant force exerted by coils 20 and 22 is in first one direction, then reverses and again assumes the original direction, the time required for reed 10 to contact points 28 will be increased by the time the direction is reversed.

In theory, the amplitude of vibration will build up as long as the energy supplied on each cycle exceeds the frictional losses per cycle of the system. It is believed that a well designed system operating in a vacuum is capable of detecting a smaller difference between two signals than has heretofore been possible by other known means.

Figure 2:
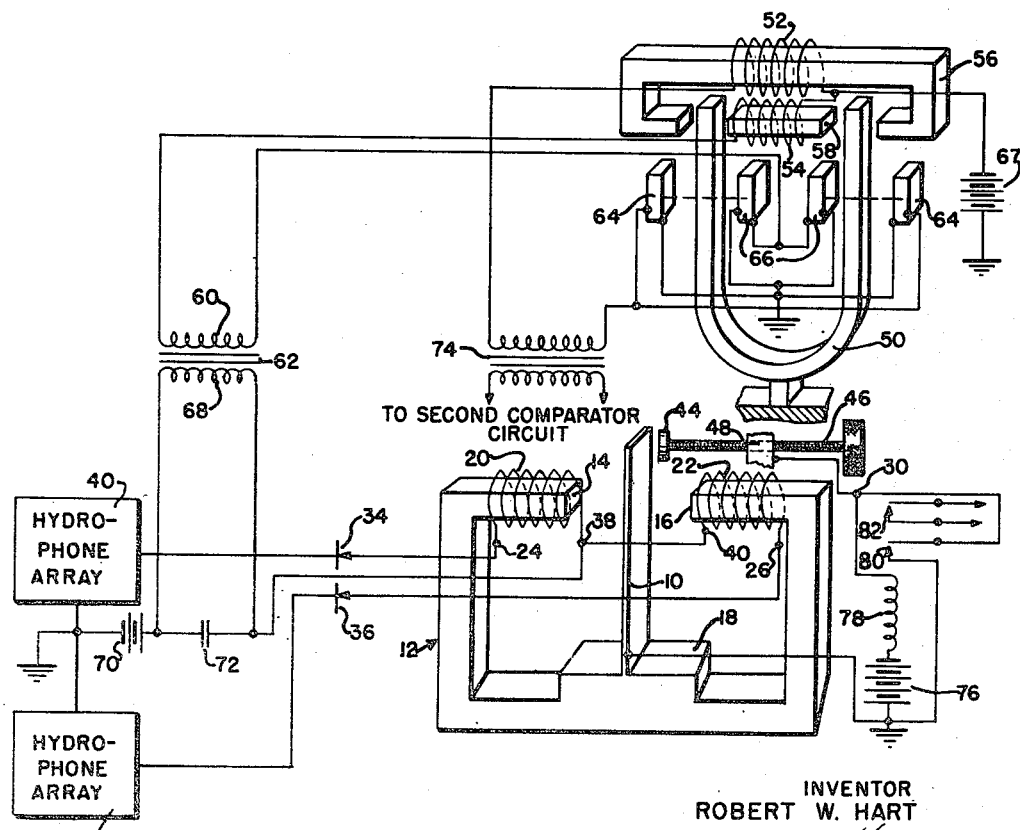
Fig. 2 is a schematic drawing of an embodiment of the present invention adapted to respond to a signal present in a surrounding transmission medium.

Reference is now made to Fig. 2 of the drawing wherein there is shown for illustrative purposes an underwater detection system constructed in accordance with the present invention. Parts in Fig. 2 are given the reference numerals of like parts in Fig. 1. In Fig. 2, source 33 of Fig. 1 is comprised of an array of hydrophones 40 while source 35 comprises a second array of hydrophones 42. Arrays 40 and 42 are composed of a number, for example 100, conventional hydrophones serially connected to provide directive arrays. A contact 44 has been substituted for points 28 of Fig. 1. Contact 44 is mounted on a screw 46 which is supported on a member 48. Member 48 occupies a fixed position relative to yoke 12. Screw 46 and contact 44 provide means for adjusting the amplitude of vibration of reed 10 necessary to complete the electrical circuit.

The keying source in Fig. 2 comprises a tuning fork 50 that is magnetically driven by coils 52 and 54 which are wound on magnetic cores 56 and 58, respectively. One terminal of coil 54 is connected to one terminal of the primary winding 60 of a transformer 62. A second terminal of winding 60 is connected to one terminal of each of two single button inertia type carbon microphones 66. A second terminal of each of microphones 66 is connected to ground.

A second terminal of coil 54, which is common to one terminal of coil 52, is connected to ground through a source of electrical energy represented by battery 67. One terminal of the secondary winding 68 of transformer 62 is connected to terminals 38 and 40 of coils 20 and 22 while the second terminal of coil 68 is connected to ground through a bias source 70. A bypass capacitor 72 is connected between the terminals of winding 68.

A second terminal of winding 52 is connected to one terminal of the primary winding of a second transformer 74. The second terminal of this primary winding is connected to one terminal of each of two inertia type carbon button microphones 64. A second terminal of each of microphones 64 is connected to ground. The secondary of transformer 74 is connected to a second reed comparator (not shown) that may be identical to the one shown in Fig. 2.

One of the microphones 64 is mounted on the outer side of each arm of fork 50 by the center button of the microphone. In a similar manner, one of microphones 66 is mounted on the inner side of each arm of fork 50.

The operation of the magnetic drive for tuning fork 50 is as follows: Assume for the moment that fork 50 is vibrating. When the arms 50 are accelerating outwardly, the resistance of carbon buttons 64 is lower than its normal value due to the fact that the inertia disks of these microphones lag the acceleration of the arm to which the microphone is attached. This lagging effect tends to compress the carbon button. When the arms of fork 50 are accelerating inwardly, the resistance of the carbon buttons of microphones 64 is somewhat greater than its normal value, again due to the lagging action of the inertia weights. When the resistance of carbon buttons 64 is reduced below its normal value, battery 67 supplies a greater than average current through coil 52. The magnetic flux set up by the current through coil 52 will urge forks 50 outwardly. The action of carbon buttons 64 is to cause the force acting on the arms of fork 50 tending to urge them outwardly to be a maximum when aceleration of the arms is directed outwardly, and to cause this force to be a minimum when the acceleration of the arms is directly inwardly. Acting in this manner coil 52 supplies energy to fork 50 to sustain its vibration.

Buttons 66 operate in the manner outlined above in connection with the description of the operation of buttons 64 to increase and decrease the current through coil 54. Yoke 58 on which coil 54 is wound is located between the arms of fork 50. The flux set up by the current in coil 54 will tend to urge the arms of fork 50 inwardly. However, since buttons 66 are located on the inner sides of the arms of forks 50, the greatest amount of current will flow through coil 54 when these arms are accelerating inwardly. Therefore, coil 54 supplies energy to the arms of fork 50 while these arms are accelerating inwardly, and coil 52 supplies energy to fork 50 while the arms are accelerating outwardly.

Buttons 66 are in parallel with each other and electrically could be replaced by a single button. However, it is essential that the natural vibrating frequency of fork 50 correspond as closely as possible to the natural frequency of reed 10. If this correspondence in frequency is to be maintained, each arm of fork 50 must carry the same weight. Therefore, for mechanical reasons one button 66 is mounted on each arm of fork 50. Two buttons 64 are employed for the same reason.

The current that flows through coil 54 also flows through the primary winding 60 of transformer 62. The voltage induced in the secondary winding 68 of transformer 62 due to the periodic current flowing in the primary winding 60 is applied as the keying signal to rectifiers 34 and 36. Bias source 70, which is electrically in series with winding 68, assures that rectifiers 34 and 36 will remain cut off for approximately one-half of each cycle of the signal from winding 68. Capacitor 72 by-passes the signals from hydrophones 40 and 42 around winding 68, which might present a relatively high inductive reactance to these signals. However, capacitor 72 is not large enough to by-pass the relatively low frequency signal from winding 68.

The operation of the circuit of Fig. 2 should be obvious from the foregoing descriptions of the operations of Fig. 1. If hydrophones 40 and 42 are placed in a fluid medium so that the major axes of the directive patterns lie in different directions, noise signals or other random signals occurring in the fluid medium will cause small vibrations to be set up in reed 10. Generally, however, the amplitude of noise signals received by hydrophones 40 and 42 will be approximately equal at any instant, hence, only the small instantaneous difference in the noise signals is available to actuate reed 10. However, over the time required for reed 10 to reach an amplitude of vibration sufficient to complete the circuit with contact 44, these different signals will average out to zero.

Suppose, however, that some steady signal, for example noise from a ship's propeller, is transmitted from a source located so that the signal received by one hydrophone, for example hydrophone 40, is greater than that received by hydrophone 42. The resulting sustained difference in the currents through coils 20 and 22 will cause the amplitude of vibration of reed 10 to increase until reed 10 contacts contact 44. The fact that the amplitude of the signal is small compared to the noise level will not prevent the system from operating, since the vibration of the reed 10 will continue to build up as a result of the steady component of signal, and other vibrations due to noise will cause the instantaneous magnitude of vibration to increase or decrease about the average vibration resulting from the steady signal.

When contact is established between reed 10 and contact 44, an electrical energy source 76 sends current through a sensitive, fast acting relay 78. Energizing relay 78 causes contacts 80 and 82 to close. Contacts 80 are in shunt with reed 10 and contact 44. Thus, contacts 80 serve as hold-in contacts to maintain relay 78 energized even though the amplitude of vibration of reed 10 should decrease. Contacts 82 may be connected to any desired external circuit.

As suggested above, hydrophones 40 and 42 are placed in a fluid medium so that the major axes of the directive patterns lie in different directions. As an illustrative example of one preferred arrangement, hydrophones 40 and 42 may be oriented so that the major axis of hydrophone 40 lies along a straight line and the major axis of hydrophone 42 lies along the same straight line but in the opposite direction. The circuit shown in Fig. 2 may then be employed to detect sounds coming from a source located at some point in the vicinity of this straight line.

If desired, a second reed comparator circuit including two more directional hydrophone arrays may be provided to cover a line at right angles to the orientation of the directional axis of hydrophones 40 and 42. The keying circuit for this additional comparator circuit may be obtained from transformer 74.

The embodiment of the invention just described is useful where the requirements are that the standby power be low or that the power supply for the system be small in size or light in weight. Rectifiers 34 and 36 require no standby power, and energy sources 67 and 76 may be relatively small, dry cell batteries.

Figure 3:
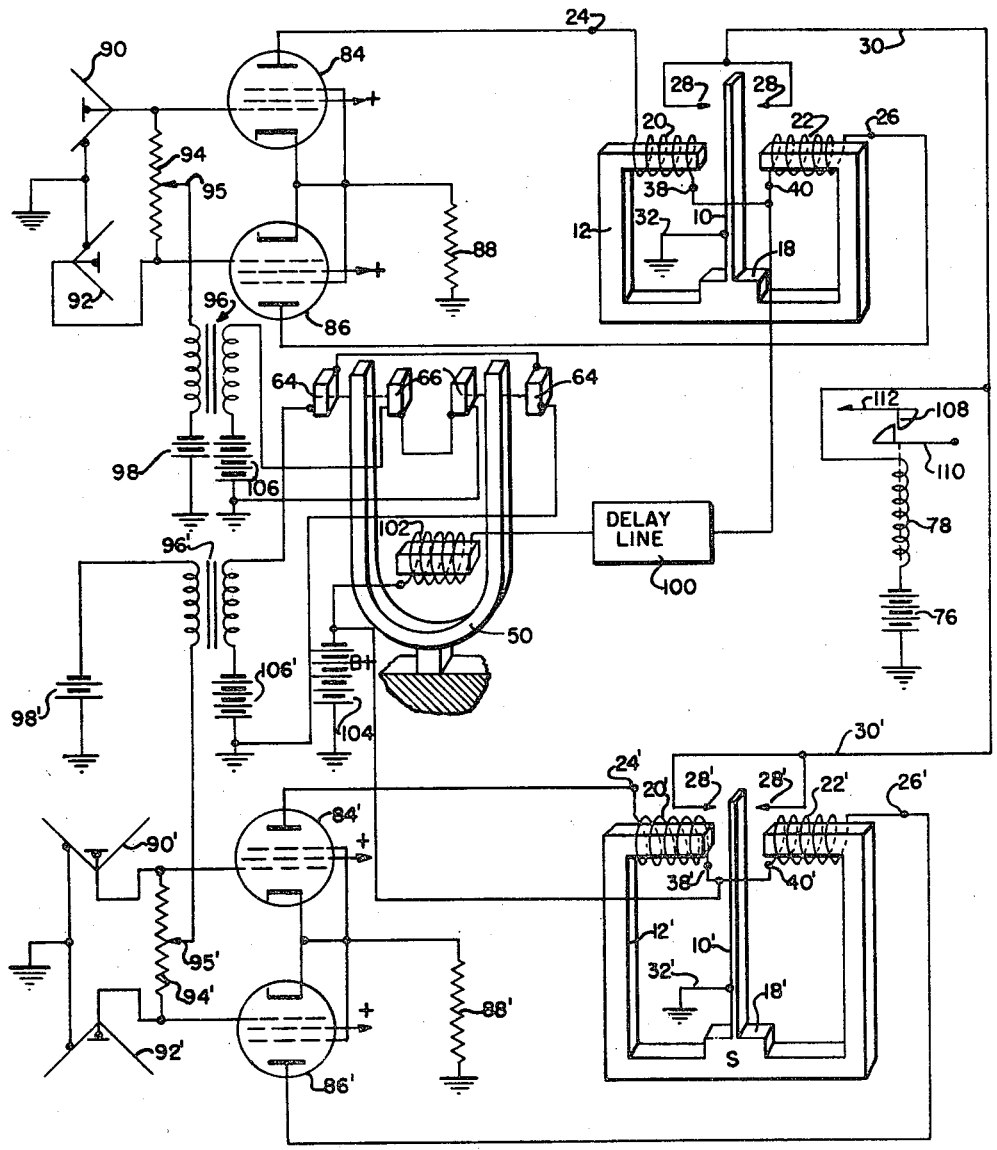
Fig. 3 is a schematic drawing of a modified form of the embodiment of Fig. 2.

If greater sensitivity is desired, for example, where it is desirable to detect signals of very low amplitude, the embodiment of the invention shown in Fig. 3 has certain advantages.

Fig. 3 illustrates a modification of the circuit of Fig. 2. Again, elements in Fig. 3 corresponding to like elements in Figs. 1 and 2 are given like reference numerals. Rectifiers 34 and 36 of Figs. 1 and 2 have been replaced by vacuum tubes 84 and 86, respectively, in Fig. 3. Vacuum tubes 84 and 86 are of the pentode type. The suppressor grid of each of these tubes is returned to the cathode while the screen grid is returned to a point of fixed positive potential. The cathodes of tubes 84 and 86 are returned to ground through a common cathode resistor 88.

Again, it should be remembered that the hydrophones 40 and 42 of Fig. 2 could be replaced by radio antennas, microphones located in air, magnetic pickups, or any one of many types signal pickups. This same consideration applies equally to Fig. 3. However, since a hydrophone array was employed for illustrative purposes in Fig. 2, a type of hydrophone array is also shown in Fig. 3. The hydrophone arrays 40 and 42 of Fig. 2 are represented schematically in Fig. 3 by arrays 90 and 92. Arrays 90 and 92 show a single hydrophone and a 90° baffle. It is to be understood that arrays 90 and 92 may comprise, in practice, any hydrophone or hydrophone array having approximately 90° beam pattern. One terminal of hydrophones 90 and 92 is returned to ground while the second terminal of hydrophone 90 is returned to the control grid of tube 84. The second terminal of hydrophone 92 is returned to the control grid of tube 86. A resistor 94 is connected between the control grid of tube 84 and the control grid of tube 86. A tap on resistor 94 is returned through the secondary of a transformer 96 and a bias source 98 to ground. As shown in Fig. 3, the anode of tube 84 is connected to terminal 24 of coil 20, while the anode of tube 86 is connected to terminal 26 of coil 22.

Terminals 38 and 40 of coils 20 and 22, respectively, are returned through a delay line 100 and a magnetic coil 102 to the positive terminal of an electrical energy source 104. Energy source 104 serves as the anode potential source for tubes 84 and 86. Coil 102 is wound on a magnetic core and serves as the driving means for tuning fork 50. The driving means shown in Fig. 3 is generally not as efficient as that shown in Fig. 2 but is entirely satisfactory when vacuum tubes 84 and 86 are employed as detectors. As will be explained in greater detail later, tubes 84 and 86 operate in push-pull in supplying signals to coils 20 and 22 but operate in parallel to supply a signal to magnetic driving coil 102.

In practice it may be desirable to employ magnetic type signal pickups in connection with the tuning fork 50 in place of carbon buttons 64 and 66. Such signal pickups provide a keying signal of sufficient amplitude to operate vacuum tubes 84 and 86. In addition, magnetic pickups have the advantage that they need not be mounted on fork 50. It should be kept in mind that any feature that reduces the load on fork 50 will increase the frequency stability of this fork. In substituting the magnetic pickups for the carbon buttons, it is preferable to connect the magnetic pickups in series. The energy source employed to energize the carbon buttons may be eliminated, or it may be modified to serve as a bias battery for the magnetic pickups. Other connections would remain substantially as shown in Fig. 2.

While it may be preferable, as stated above, to employ magnetic pickups in place of carbon buttons 64 and 66, it is to be understood that such carbon buttons may be used in connection with tubes 84 and 86. To simplify the description of this invention, it will be assumed that carbon buttons are also used in the circuit of Fig. 3.

In the embodiment of the invention shown in Fig. 3, carbon buttons 66 are connected in series rather than in parallel as was the case in Fig. 2. This series connection provides a larger change in current for a given amplitude of vibrations of fork 50 than does the parallel connection of Fig. 2. Connected in series with carbon buttons 66 is the primary of transformer 96 and an energy source 106.

As the resistance of carbon buttons 66 varies, a variable current flows from source 106 through the primary of transformer 96 and on through carbon buttons 66. This variable current through the primary of transformer 96 induces a periodic voltage in the secondary of this transformer. This periodic voltage is applied as the keying voltage to the control grids of vacuum tubes 84 and 86.

With fork 50 in operation supplying keying voltage to tubes 84 and 86, tap 95 on resistor 94 is adjusted so that when equal signals are being received by hydrophones 90 and 92 the currents through coils 20 and 22 are equal. Once tap 95 is adjusted to its proper value, the operation of the circuit of Fig. 3 is very similar to the operation of the circuit of Fig. 2. The signal from the secondary of transformer 96 is applied equally to the control grids of rectifier tubes 84 and 86. Signals received by hydrophone 90 are applied to the control grid of tube 84 and signals received by hydrophone 92 are applied to the control grid of tube 86. If the signals received by hydrophones 90 and 92 are identical, the magnetic flux set up by coils 20 and 22 will be equal and reed 10 will not vibrate. If, however, the signal received by one hydrophone is greater than that received by the other hydrophone, reed 10 will receive a pulse of energy on alternate half cycles of the signal from transformer 96. As explained above, this energy will cause reed 10 to vibrate and, if continued, will cause reed 10 to contact points 28. The contacts 80 and 82 of relay 78, as shown in Fig. 2, have been replaced by mechanical release mechanism 108 of Fig. 3. When reed 10 contacts points 28, relay 78 is energized and catch 110 is pulled down, allowing member 112 to move to the left. Member 112 may be caused to move to the left by means of a spring (not shown). Since contacts 80 of Fig. 2 and release mechanism 108 of Fig. 3 have been used as illustrative of ways of obtaining an output from the comparator circuit, it should be obvious that either contacts 80 or release mechanism 108, both in combination, or any mechanical or electrical equivalent may be employed without altering the scope of the invention.

The current flowing through coils 20 and 22 passes through delay line 100 and thence through coil 102 to energy source 104. Even without a signal from hydrophones 90 and 92, the current through coil 102 will be periodic in nature due to the keying action of transformer 96. This periodic voltage is employed to maintain the vibrations of the arms of tuning fork 50. It has been found in practice that, without delay line 100, the current through coil 102 would lead the optimum driving current for fork 50. For this reason, delay line 100 is added to cause the phase of the current in coil 102 to be such that optimum transfer of energy to fork 50 is obtained.

Also shown in Fig. 3 is a second reed comparator circuit substantially identical to the one just described. Since the circuits are nearly identical, parts in this second comparator circuit have been given prime numbers corresponding to the reference numerals of the described circuit. This second circuit differs from the described circuit only in the feature that terminals 38' and 40' are connected directly to source 104 rather than being connected through delay line 100 and coil 102 as are corresponding terminals 38 and 40. The keying signal for this second circuit is supplied through the action of carbon buttons 64 and the output points 28' are connected to relay 78 through conductor 30'.

In one preferred embodiment of the invention, hydrophones 90 and 92 are oriented in opposite directions along a straight line while hydrophones 90' and 92' are oriented in opposite directions along a line at right angles to the first-mentioned lines. If the beam patterns from each of the hydrophones covers slightly more than a ninety degree sector, complete 360° coverage will be obtained. It should be noted that the directional hydrophones are provided for the purpose of causing signals from a single source to appear as unequal signals at the control grids of tubes 84 and 86 rather than for the purpose of locating the direction from which the signals are received. If determining direction is important, the reed comparator circuits may be connected to operate separate relays.

By the way of a summary of the more important features of the invention, it should be remembered that, for optimum operation, the frequency of the keying source (which means the frequency of fork 50 in Figs. 2 and 3) should be exactly equal to the frequency of vibration of reed 10. Also, the keying signal should be such that the rectifiers are rendered non-conducting for approximately one half of each cycle of the keying signal.

The characteristics of the two coils 20 and 22 and of the two rectifiers should be as nearly identical as possible since equal input signals to the rectifiers should result in equal but opposite magnetic forces acting on reed 10. As was illustrated in Fig. 3, compensating circuits may be supplied to correct inequalities in the forces developed by equal input signals.

The system including yoke 12 and reed 10 should be constructed to minimize air, molecular, and magnetic friction and any other friction that would tend to damp out vibrations in reed 10. The circuit when thus constructed will not respond to high amplitude signals of very short duration but will respond to sustained signals of any amplitude.

It will be obvious to those skilled in the art that, as stated above, directional microphones may be substituted for the directional hydrophones, that modified forms of its keying source may be provided, and that various other changes and modifications may be made in the preferred embodiments shown without departing from the spirit and scope of the invention. Therefore, while there has been described what are at present considered the preferred embodiments of the invention, it is intended that the scope of the invention be limited solely by the appended claims.

The invention described herein may be manufactured and used by or for the Government of the United States of America for government purposes without the payment of royalty thereon or therefor.

What is claimed is:

1. Means for comparing two signals comprising a yoke of magnetic material, said yoke having first and second spaced pole pieces, a reed of magnetic material extending between said two spaced pole pieces, a first and a second coil wound on said first and said second pole pieces, respectively, first rectifier means connecting a first source of signals to be compared to said first coil, second rectifier means connecting a second source of signals to be compared to said second coil and means for simultaneously rendering said first and said second rectifier alternately conductive and non-conductive.

2. Means for detecting the presence of a signal comprising a yoke of magnetic material, said yoke having first and second spaced pole pieces, a reed of magnetic material extending between said two spaced pole pieces, a first and a second coil wound on said first and second pole pieces, respectively, said coils having the characteristic that equal changes in current in said two coils result in equal changes in magnetic flux in said two pole pieces, a first and a second detector means responsive to said signal, said detector means each providing an electrical output signal, means for connecting said first detector means to said first coil through a first rectifier means, means for connecting said second detector means to said second coil through a second rectifier means, and means for periodically varying the conductivity of said rectifiers.

3. Means for comparing signals from a first and a second source comprising a yoke of magnetic material having first and second spaced pole pieces, a flexible reed of magnetic material rigidly mounted at one end, the free end of said reed extending between said spaced pole pieces, a coil wound on said first pole piece, a second coil wound on said second pole piece, first rectifier means connecting said first signal source to said first coil, second rectifier means connecting said second signal source to said second coil, means for periodically altering the conductivity of said rectifiers, and means for completing an electrical circuit whenever the amplitude of vibration of said reed reaches a predetermined magnitude.

4. Means for comparing signals from a first and a second source comprising a yoke of magnetic material having first and second spaced pole pieces, a flexible reed of magnetic material having one end thereof rigidly secured to said yoke, the free end of said reed extending between said pole pieces, a coil wound on said first pole piece, a second coil wound on said second pole piece, said first and second coils having the characteristic that equal changes in current in said two coils result in equal changes in magnetic flux in said two pole pieces, first rectifier means connecting said first signal source to said first coil, second rectifier means connecting said second signal source to said second coil, means for periodically altering the conductivity of said rectifier, and means for completing an electrical circuit whenever the amplitude of vibration of said reed reaches a predetermined value.

5. Means for comparing the electrical signals from two sources comprising a U-shaped yoke of magnetic material, said yoke having first and second inwardly extending pole pieces disposed at the ends of said U, a reed of magnetic material secured by one end to said yoke at a point intermediate said pole pieces, the free end of said reed extending between said pole pieces, said reed being free to vibrate in the plane of said yoke, a first and a second coil surrounding said first and second pole pieces, respectively, said first and second coils having the characteristic that equal changes in current in said two coils result in equal changes in magnetic flux in said two pole pieces, a first rectifier means connecting one terminal of one of said signal sources to one terminal of said first coil, a second rectifier connecting one terminal of said second source to one terminal of said second coil, and means for applying a keying signal between a second terminal of said first and second coils and a second terminal on said first and second sources.

6. A circuit for comparing the electrical signals from two sources comprising a magnetic reed, one end of which is free to vibrate, extending between a first and a second electromagnet, a first rectifier, means for applying to said first rectifier one of the signals to be compared and a keying signal of frequency equal to the natural vibratory frequency of said reed, means for connecting the output of said first rectifier to said first electromagnet, a second rectifier, means for applying to said second rectifier the other of said signals to be compared and said keying signal, means for connecting the output of said second rectifier to said second electromagnet, and means for completing an electrical circuit whenever the amplitude of vibration of said reed exceeds a predetermined value.

7. A circuit for detecting the presence of a signal comprising first and second directional receivers for receiving said signal and providing an electrical output signal in response thereto, a first and a second electromagnet oriented in a colinear spaced relationship, a reed of magnetic material having a free end extending between said two electromagnets, a first rectifier, a source of keying signals, means for applying said output signal from said first receiver and said source of keying signals to said first rectifier, means for applying the output of said first rectifier to said first electromagnet, a second rectifier, means for applying said signal from said second receiver and said keying source to said second rectifier, means for applying the output of said rectifier to said second electromagnet, and means for completing an electrical circuit whenever the amplitude of vibration of said reed exceeds a predetermined value.

8. Apparatus as claimed in claim 7, wherein said source of keying signals comprises a tuning fork of frequency equal to the vibratory frequency of said reed, means for driving said tuning fork at its resonant frequency, inertia operated variable resistance devices mounted on the arms of said tuning forks, a source of electrical energy and a transformer connected in series with said variable resistance device, the secondary of said transformer providing said keying signal to said rectifiers.

9. Apparatus as claimed in claim 7 wherein said source of keying signals comprises a tuning fork, means for driving said fork at its natural frequency, first variable resistance means responsive to the inward acceleration of the arms of said tuning fork, second variable resistance means responsive to the outward acceleration of said tuning fork, a first and a second tuning fork drive coil, a first series circuit including a source of electrical energy, said first variable resistance device and said first drive coil, a second series circuit including a source of electrical energy, said second variable resistance and said second drive coil, at least one of said series circuits also including the primary winding of a transformer, the secondary winding of said transformer providing said keying signal.

10. A circuit as claimed in claim 7 wherein said source of keying signals comprises a tuning fork, variable resistance means responsive to the acceleration of arms of said tuning fork, a series circuit including a source of electrical energy, said variable resistance means and the primary of a transformer, the secondary of said transformer providing an output connection for said circuit.

11. A circuit for detecting the presence of an underwater signal comprising first and second directional hydrophone receivers for receiving said signal and providing an electrical output signal in response thereto, a first and a second electromagnet oriented in a colinear spaced relationship, a reed of magnetic material having a free end extending between said two electromagnets, a first rectifier, a source of keying signals, means for applying said output signals from said first receiver and said source of keying signals to said first rectifier, means for applying the output of said first rectifier to said first electromagnet, a second rectifier, means for applying said signals from said second receiver and said keying source to said second rectifier, means for applying the output of said rectifier to said second electromagnet, the relationship between said first and second electromagnets and said reeds being such that equal output signals from said two receivers will result in equal and opposite forces being applied to said reed, and means for completing an electrical circuit whenever the amplitude of vibration of said reed exceeds a predetermined value.

12. Apparatus as claimed in claim 11, wherein said source of keying signals comprises a tuning fork of frequency equal to the vibratory frequency of said reed, means for driving said tuning fork at its resonant frequency, inertia operated variable resistance devices mounted on the arms of said tuning forks, a source of electrical energy and a transformer connected in series with said variable resistance device, the secondary of said transformer providing said keying signal to said rectifiers.

13. A circuit for detecting the presence of a signal comprising first and second directional receivers for receiving said signal and providing an electrical output in response thereto, a first and a second electromagnet oriented in a co-linear spaced relationship, a reed of magnetic material having a free end extending between said two electromagnets, a first vacuum tube rectifier, a source of keying signals, means for applying said output signals from said receiver and said keying source to the grid of said first vacuum tube rectifier, means for applying the output of said first rectifier to said first electromagnet, a second vacuum tube rectifier, means for applying said signals from said second receiver and said keying source to said second rectifier, means for applying the output of said rectifier to said second electromagnet, the above-described circuit having the characteristic that equal signals to said two receivers result in equal but oppositely directed forces being applied to said reed through the said electromagnets, and means for completing an electrical circuit whenever the amplitude of vibration of said reed exceeds a predetermined value.

14. Apparatus as claimed in claim 13 wherein said source of keying signals comprises a tuning fork of frequency equal to the vibratory frequency of said reed, means for driving said tuning fork at its resonant frequency, magnetic pickup means responsive to the instantaneous position of the arms of said tuning fork, a transformer connected to said magnetic pickup means, the secondary of said transformer providing said keying signals to said vacuum tube rectifiers.

15. Apparatus for detecting the presence of a signal comprising first and second receiving means, a tuned resonant system, means coupling said first receiving means to said resonant system such that reception of a signal by said first receiving means tends to cause said system to oscillate, means coupling said second receiving means to said resonant system such that reception of a signal by said second receiving means tends to cause said system to oscillate in a phase opposite to the phase of said first-mentioned oscillation, means for periodically decoupling said receivers from said resonant system at a frequency equal to the resonant frequency of said system, and means indicating when the oscillation of said system reaches a predetermined amplitude.

16. Apparatus for comparing the amplitude of two signals comprising a first receiver responsive to one of said signals, a second receiver responsive to the other of said signals, a reed resonant at a predetermined frequency, first and second reed actuating means adapted to actuate said reed in opposite directions, means for periodically coupling said first and second receiver to said first and second reed actuating means, respectively, at the said resonant frequency of said reed, and means for indicating when the amplitude of oscillations of said reed reaches a predetermined value.

17. Apparatus for detecting the presence of a signal comprising first signal receiver means, second signal receiver means, a tuned resonant system, and means periodically and simultaneously coupling said first and second signal receiver means to said resonant system at the frequency of said resonant system, the signal from one of said signal receiver means tending to increase the amplitude of oscillation of said system, the signal from the other of said signal receiver means tending to decrease the amplitude of oscillation of said system, whereby unequal signal inputs to said first and said second signal receiver means result in a change in the amplitude of oscillation of said resonant system.

18. Apparatus for detecting the presence of a signal comprising first signal receiver means, second signal receiver means, a tuned resonant system, means periodically and simultaneously coupling said first and second signal receiver means to said resonant system at the resonant frequency of said system, and means indicating when the amplitude of oscillation of said system reaches a predetermined value.

19. Apparatus for detecting the presence of a signal comprising first signal receiver means, second signal receiver means, a tuned resonant system, means periodically and simultaneously coupling said first and said second signal receiver means to said resonant system at the frequency of said resonant system, said coupling means being so arranged that unequal signal inputs to said first and said second signal receiver means result in a change in the amplitude of oscillation of said resonant system and means indicating when the amplitude of said oscillation reaches a predetermined value.

20. Apparatus for detecting the presence of a signal comprising first signal receiver means, second signal receiver means, a tuned resonant system, means coupling said first and said second signal receiver means to said resonant system, and means periodically and simultaneously decoupling said first and said second signal receiver means from said resonant system at the resonant frequency of said system, said coupling means being so arranged that unequal signal inputs to said first and said second signal receiver means result in changes in the amplitude of oscillation of said resonant system, and means indicating when the amplitude of said oscillation reaches a predetermined value.

ROBERT W. HART.

REFERENCES CITED

The following references are of record in the file of this patent:

UNITED STATES PATENTS

| Number | Name | Date |
|---|---|---|
| 913,372 | Gardner | Feb. 23, 1909 |
| 1,262,333 | Hall | Apr. 9, 1918 |
| 1,821,181 | Gunn | Sept. 1, 1931 |
| 1,872,257 | Durkee | Aug. 16, 1932 |
| 2,040,734 | Gallagher | May 12, 1936 |
| 2,198,901 | Boswau | Apr. 30, 1940 |
| 2,401,955 | Olson et al. | June 11, 1946 |